United States Patent
Lau

(10) Patent No.: US 9,681,641 B2
(45) Date of Patent: Jun. 20, 2017

(54) PET CARRIER BAG WITH INTERCHANGEABLE SHELL

(71) Applicant: Michelle Lau, Las Vegas, NV (US)

(72) Inventor: Michelle Lau, Las Vegas, NV (US)

( * ) Notice: Subject to any disclaimer, the term of this patent is extended or adjusted under 35 U.S.C. 154(b) by 144 days.

(21) Appl. No.: 14/850,796

(22) Filed: Sep. 10, 2015

(65) Prior Publication Data

US 2017/0071148 A1   Mar. 16, 2017

(51) Int. Cl.
*A01K 1/00*    (2006.01)
*A45C 3/08*    (2006.01)
*A01K 1/02*    (2006.01)

(52) U.S. Cl.
CPC .................. *A01K 1/0254* (2013.01)

(58) Field of Classification Search
CPC ...... A01K 1/0254; A01K 1/02; A01K 1/0245; A45C 3/08
USPC ........................... 119/482, 496, 497; 150/105
See application file for complete search history.

(56) References Cited

U.S. PATENT DOCUMENTS

| | | | | |
|---|---|---|---|---|
| 2,437,382 A * | 3/1948 | Czap | .................. | A45C 3/06 150/105 |
| 3,850,144 A | 11/1974 | Springer et al. | | |
| 4,716,947 A * | 1/1988 | Haddock | .................. | A45C 3/00 150/105 |
| 4,907,633 A * | 3/1990 | Eckstein | .................. | A45C 3/08 150/105 |
| 5,170,745 A | 12/1992 | Burdette, Jr. | | |
| 5,413,199 A * | 5/1995 | Clement | .................. | A45C 3/00 150/111 |
| 5,603,573 A * | 2/1997 | Mercier | .............. | A01K 1/0236 119/497 |
| 5,671,698 A * | 9/1997 | Farrugia | .............. | A01K 1/0254 119/497 |
| 5,931,120 A * | 8/1999 | Burns | .................. | A01K 1/0254 119/497 |
| 6,029,723 A * | 2/2000 | Baquero | .................. | A45C 3/08 150/105 |
| 6,186,201 B1 * | 2/2001 | Salz | .......................... | A45C 3/08 150/104 |

(Continued)

FOREIGN PATENT DOCUMENTS

| | | |
|---|---|---|
| CA | 2570857 | 1/2006 |
| EP | 2421401 | 2/2012 |

(Continued)

*Primary Examiner* — Kristen C Hayes
(74) *Attorney, Agent, or Firm* — Weide & Miller, Ltd.

(57) ABSTRACT

An interchangeable pet carrier system includes a pet carrier and at least one handbag. The pet carrier includes a bottom panel, a pair of long side panels and a pair a short side panels connected to the bottom panel, and a top panel connected to top edges of the side panels. A zipper is disposed on the carrier to run through the top carrier panel to separate the top carrier panel into first and second sides, and to run partially down the short side carrier panels. Alternating connectors are disposed along an exterior of an upper portion of side panels. The handbag has a bottom panel connected to short and long side panels. Alternating male and female connectors are disposed along an interior of an upper portion of the side panels. The carrier is inserted into the handbag and is secure via corresponding alternating male and female connectors.

20 Claims, 9 Drawing Sheets

(56) References Cited

U.S. PATENT DOCUMENTS

| | | | | |
|---|---|---|---|---|
| 6,581,545 B1 * | 6/2003 | Foster | ............... | A01K 1/0245 |
| | | | | 119/470 |
| 8,261,698 B1 | 9/2012 | McClain | | |
| 2006/0021684 A1 * | 2/2006 | DeCoro, III | ............ | A45C 3/08 |
| | | | | 150/105 |
| 2007/0209742 A1 * | 9/2007 | Morgan | ................ | A45C 3/08 |
| | | | | 150/105 |
| 2008/0185082 A1 * | 8/2008 | Mejia | ..................... | A45C 3/08 |
| | | | | 150/105 |

FOREIGN PATENT DOCUMENTS

| | | |
|---|---|---|
| EP | 2640216 | 9/2013 |
| WO | WO 2008/073374 | 6/2008 |
| WO | WO 2011/156770 | 12/2011 |

* cited by examiner

PET CARRIER BAG WITH INTERCHANGEABLE SHELL

BACKGROUND

1. Field

The disclosed embodiments relate pet carriers. More specifically, the disclosed embodiments relate to pet carriers with interchangeable shells.

2. Related Art

Pet owners enjoy having the company of their animals not only at home, but also on the go. Additionally, many pets may have less anxiety when they travel with an owner as opposed to staying at the owner's home alone. When in public, pet owners are responsible for keeping their pets under control, often by way of a leash or a pet carrier.

Especially with small pets, a pet carrier may be an efficient way for an owner to take a pet out in public. The small pets and their small sized carriers are not heavy, and they may be easily transported by the owner. Typical pet carriers include an enclosed, ventilated space with a handle or strap for carrying.

Typical pet carriers are designed mainly for functionality and the comfort of the animal. Indeed, a pet may grow accustomed and develop a feeling of security in its particular carrier based on the familiar look, feel, and smell of the carrier. However, pet owners who wish to bring their pet along in a pet carrier may feel that the functional nature of the pet carrier is not very stylish. Other pet owners may wish to travel with different types, styles, or colors of pet carriers, but do not want to cause their pets undue stress by introducing them to new carriers.

Typical pet carriers also typically lack storage for other things besides the pet. This makes it necessary for the pet owner to carry additional bags in order to facilitate pet items such as food, water, bowls, etc. or personal belongings, such as keys, wallets, personal items, or cell phones, tablets, and laptops. Thus a flexible pet carrier that is both stylish and functional is desired.

SUMMARY

Accordingly, the disclosed embodiments are directed to a pet carrier, a handbag, and a pet carrier system that overcomes the above the drawbacks. According to some embodiments, there is an interchangeable pet carrier system comprising a pet carrier and at least one handbag. The pet carrier comprises a bottom carrier panel, a pair of opposing short side carrier panels connected to the bottom carrier panel, a pair of opposing long side carrier panels connected to the bottom carrier panel, the opposing long side carrier panels being disposed between the opposing short side carrier panels, and a top carrier panel disposed on top sides of the long side carrier panels and the short side carrier panels. A carrier zipper is disposed to run through the top carrier panel to separate the top carrier panel into first and second sides, and is disposed to run partially down the short side carrier panels.

Alternating first male and female connectors are disposed along an exterior of an upper portion of the long side carrier panels and the short side carrier panels. A pair of first carrying straps may be connected to at least one of the long side carrier panels and the short side carrier panels.

The least one handbag comprises a bottom bag panel, a pair of opposing short side bag panels connected to the connected to the bottom bag panel, and a pair of opposing long side bag panels connected to the bottom bag panel, the opposing long side bag panels being disposed between the opposing short side carrier panels. A bag zipper is disposed along an upper portion of a connection between the short side carrier panels and the long side carrier panels. That is, there may be a vertical zipper along upper corners of the at least one handbag.

Alternating second male and female connectors are disposed along an interior of an upper portion of the long side bag panels and the short side bag panels. A pair of second carrying straps may be connected to at least one of the long side bag panels and the short side bag panels.

The alternating first male and female connectors are arranged along the carrier so as to align with the alternating second male and female connectors disposed on the at least one handbag. In this manner, the carrier may be releasably secured within the handbag via the first and second alternating male and female connectors.

In some embodiments, the at least one handbag includes a plurality of handbags having different exterior shapes. In still further embodiments, the pet carrier may comprise third male and female connectors disposed on an interior of the short side carrier panels below the first male and female connectors. When the bag zippers (vertical corner zippers) are in an open condition, the second male and female connectors on the short side bag panels are configured to connect with the third male and female connectors such that the short side bag panels are folded over and form a pet headrest.

In other embodiments, the at least one handbag includes at least one storage pocket disposed on an exterior surface of at least one of the long side bag panels and short side bag panels. Among such storage pockets, the at least one handbag may include a lower pocket disposed within or on the bottom bag panel extending throughout or covering the bottom bag panel. This lower pocket may be configured to store a tablet computing device. The carrier may also comprise a pad that is disposed within the carrier on top of the bottom carrier panel on which a pet may sit.

The male and female connectors may comprise male and female snaps that are configured to connect together. The system may also incorporate other similar connectors where the connectors halves are configured to alternate along the carrier and the at least one handbag. For example, the connector halves could comprise alternating north and south poled magnets, or a hook side and a loop side of hook and loop fasteners. In some embodiments, the zippers may be a one way zipper. In other embodiments, the zippers may be two-way zippers.

With the interchangeable handbag system, the pet carrier may be inserted into one of many differently shaped bags to accommodate the particular style or desired colors of the user for a given occasion. Further, in some embodiments, when the carrier is not inserted into the at least one handbag, the alternating connector halves on the interior of the bag may be configured to attach together to alter the shape of the at least on handbag.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Various embodiments of an interchangeable pet carrier handbag system, such as for carrying small animals, are disclosed herein. The system may include a foundational or inner base bag that is a pet travel bag and outer or shell handbag/shoulder tote bag, having multiple exterior storage compartment and decorative elements. The system thus may be comprised of two completely independent functioning stand-alone bags that are designed to perfectly align and be to be nestled together, to simultaneously serve as a pet carrier and a fashion accessory with ample storage for personal belongings.

Figure 1:
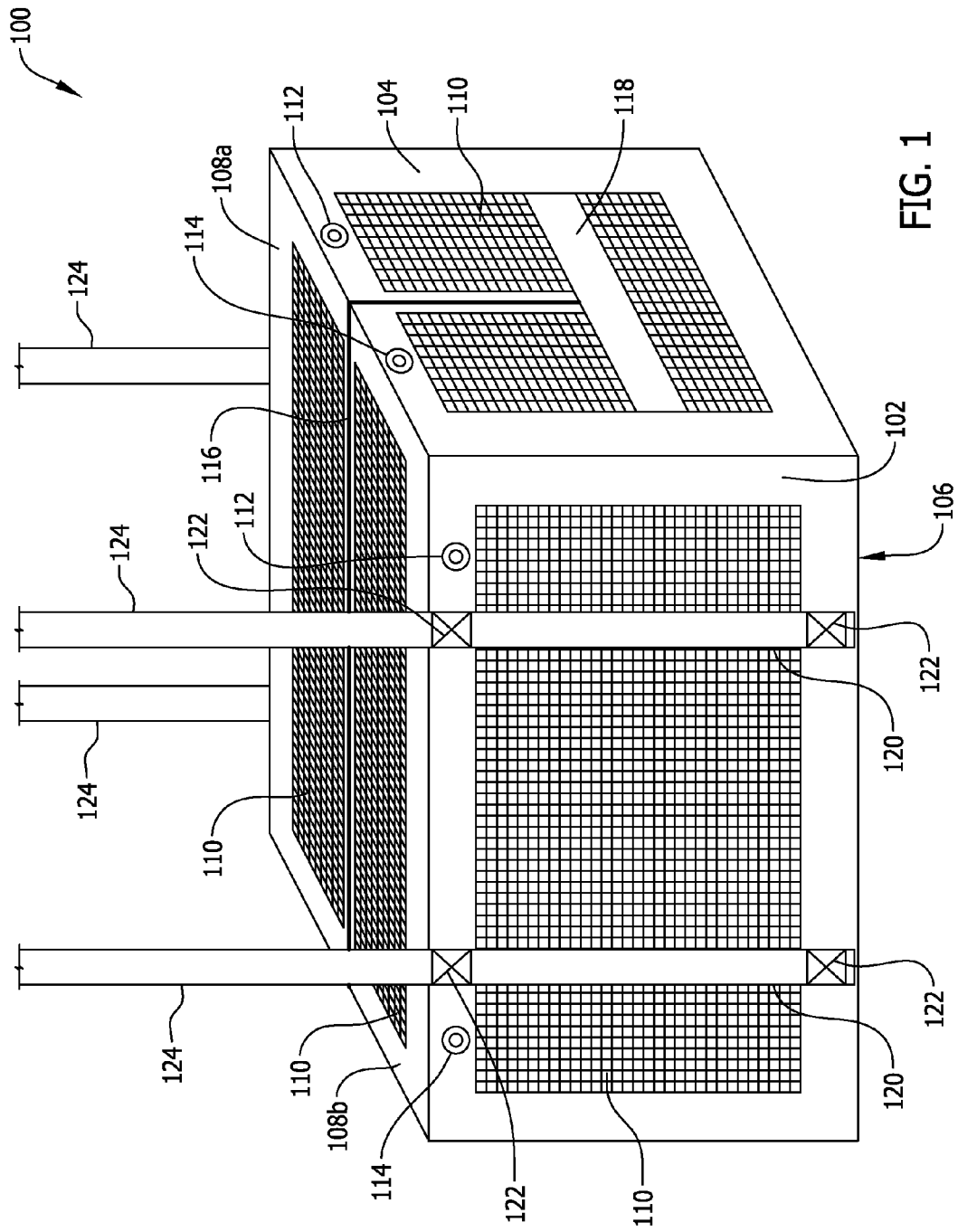
FIG. 1 shows a perspective view of an interchangeable pet carrier, according to one exemplary embodiment.

FIG. 1 shows a perspective view of an interchangeable pet carrier, according to one exemplary embodiment. The interchangeable pet carrier 100 is formed to enclose a pet therein. Specifically, the carrier 100 includes a first pair of long opposite side panels 102, a second pair of short opposite side panels 104, a bottom panel 106 connected to bottom sides of the side panels 102, 104, and a top panel 108 connected to top sides of the side panels 102, 104. The panels may be made from any suitable material including real or synthetic rubber, natural or synthetic fabrics, or the like.

The side panels 102, 104, and top panel 108 include a breathable mesh material 110. The mesh material 110 provides ventilation to the interior of the carrier 100 so that a pet may be carried therein. The size of the pet carrier 100 may vary depending on the size of the pet to be carried and the desired size of the handbag (described below) to be utilized. In one embodiment, the pet carrier 100 is approximately 15 inches long, 7.5 inches wide, and 9 inches tall.

The interchangeable pet carrier 100 includes a number of connectors to attach the carrier 100 to a handbag (described below). In this embodiment, a number of snaps 112, 114 are attached to an upper portion of the side panels 102, 104. While snaps are used in the present embodiment, other connectors may also be used such as hook and loop fasteners (Velcro™), magnets, buttons, or the like.

In this embodiment, a male snap 112 and a female snap 114 are alternately disposed on each panel 102, 104 around the circumference of the carrier 100. The snaps 112, 114 are disposed on the side panels 102, 104 near the top of the pet carrier 100 in this embodiment. However, the snaps 112, 114 may be placed at any suitable position to interact with a handbag, as described in more detail below.

The top panel 108 is divided into two panels 108a and 108b connected by a zipper 116. The zipper 116 may be a two way zipper. The zipper 116 also extends from the top panel 108 partially down the short side panels 104. This allows for easy entrance and exit for the pet into and out of the carrier 100.

In some embodiments, the short side panel 104 may have a horizontal strip 118 formed from a synthetic or natural rubber, leather, fabric, or other material. The horizontal strip 118 is disposed at a position part of the way up on the side panel 104 adjacent to the end of the zipper 116. The horizontal strip 118 provides reinforcement against the lateral forces caused by opening the carrier 100 along the zipper 116. The horizontal strip 118 may also provide reinforcement for a pet head rest, which is described in more detail below.

The carrier 100 may also include vertical reinforcement strips 120 attached via stitching 122 to the long side panels 102. The reinforcement strips 120 may extend upwards from the side panels 102 to form straps 124, such as shoulder straps, for carrying the carrier 100. The reinforcement strips 120 and shoulder straps 124 may be formed from any suitable material including natural or synthetic rubber, leather, fabric, or the like. The stitching 122 to attach the strips 120 to the panels 102 may instead be any other suitable connection including adhesives, fasteners, and the like. Alternately, the reinforcement strips 120 may be formed integrally with the side panel 102. In some embodiments, the vertical strips 120 may be disposed on the short side panels 104 and the straps 124 may extend from the tops of the short side panels 104.

Figure 2:
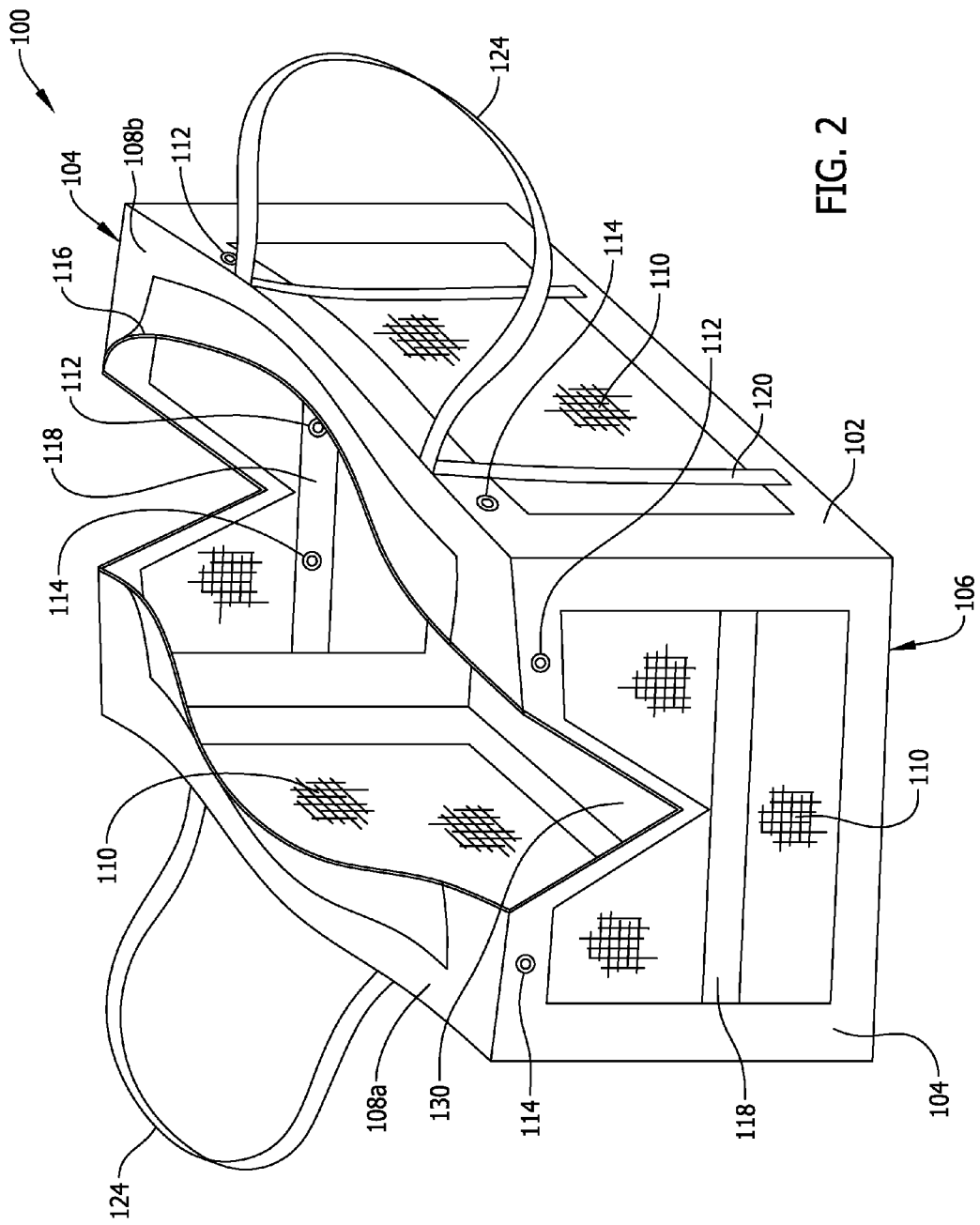
FIG. 2 shows a perspective view of an interchangeable pet carrier in an open configuration, according to one exemplary embodiment.

FIG. 2 shows a perspective view of an interchangeable pet carrier in an open configuration, according to one exemplary embodiment. Here, the portions of the top panel 108a, 108b are separated by opening the two way zipper 116. Within the carrier 100 rests a pad 130 on top of the bottom panel 106. The pad 130 may have a substantially rigid, shape-retaining base (or the bottom panel 106 may be formed to be substantially rigid) and a foam or otherwise compliant top surface on which a pet may rest. The pad 130 may have absorbent or waterproof qualities as desired and as is known in the art, and may be disposable or reusable.

The horizontal strip 118 includes connectors on the interior side of the short side panels 104. In this embodiment, the connectors comprise a male snap 112 and a female snap 114. However, other connectors may be used such as magnets, hook and loop fasteners, and the like. The snaps 112, 114 on the inside of the strip 118 are configured to create a resting spot for the head of a pet in combination with the handbag, which is described in more detail below.

Figure 3:
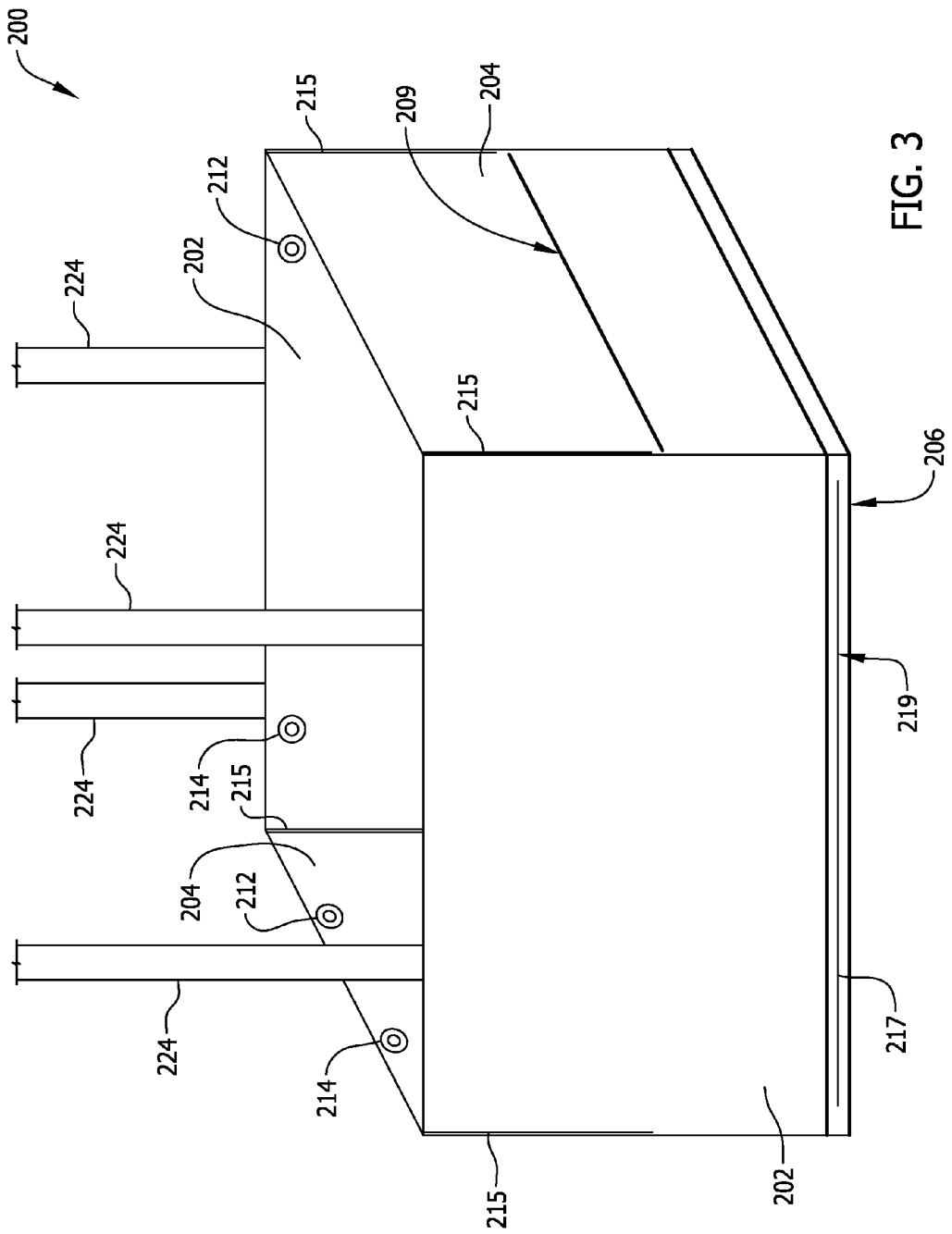
FIG. 3 shows a perspective view of an exemplary handbag accommodating an interchangeable pet carrier, according to one exemplary embodiment.

FIG. 3 shows a perspective view of an exemplary handbag accommodating an interchangeable pet carrier, according to one exemplary embodiment. A carryable tote or handbag 200 is formed from two opposing long side panels 202, two opposing short side panels 204, and a bottom panel 206. The side panels 202, 204 are joined at side edges thereof, and the bottom panel 206 is joined to the bottom edge of the side panels 202, 204.

The side panels 202, 204 and bottom panel 206 may be formed integrally, or may be formed separately and then may be connected together, such as via sewing, adhesives, fasteners, or other means or combinations thereof. The side panels 202, 204 may be formed of any suitable material based on the desired style of the handbag 202. For example, various synthetic or natural fabrics may be used such as polyesters, cotton, denim, canvas, etc. Other materials such as natural or synthetic leathers, plastics, rubber materials, suedes, etc. may also be used.

The side panels 202, 204 may include one or more pockets 204. The pockets 204 allow the user to store various items within the handbag 200. While FIG. 2 shows one pocket in side panel 204, pockets may be disposed in the long side panels 202. Multiple pockets may be formed on the panels 202, 204, or a single pocket may be included as shown. The pockets may include flaps and/or fasteners for closing the pockets.

The interior of the handbag 200 is fitted with a plurality of connectors. Specifically, alternating male snaps 212 and female snaps 214 are disposed on a top portion of the interior sides of the side panels 202, 204. Of course, other connectors may be used such as hook and loop connectors, magnets, fasteners may be used. Such fasteners may also be positioned with each side of the fastener alternately arranged around the interior of the handbag 200. For example, magnetic connectors with alternating north/south polarity may be used.

Zippers 215 are disposed between the short side panels 204 and the long side panels 202. The zippers 215 extend from a top edge of the side panels 202, 204 partially down towards the bottom of the bag 200. The zippers 215 allow for easier attachment of the handbag 200 to the interchangeable pet carrier 100, and offer other advantages, which will be explained below.

In some embodiments, the handbag 200 may also include a lower compartment or pocket 219 accessible via one or more zippers 217. The lower compartment 219 is disposed parallel to or within the bottom panel 206. The lower compartment 219 may be particularly configured for a mobile device, such as a laptop or tablet computing device. A zipper 217 may be disposed on one or more sides of the bag 200 for convenience in access the compartment 219.

The lower compartment 219 may provide for a number of advantages. Because the lower compartment 219 facilitates a laptop or tablet computer, the bag 200 and any pet carrier 100 that may be disposed therein may be stabilized due to the position of the lower compartment 219 being on or within the bottom panel 206. As compared to where a tablet or laptop is stowed on a side storage compartment on a bag, the bottom compartment 219 provides a safer and more convenient way to transport both a pet and the tablet or laptop. This is because the weight of the bag is more evenly distributed, facilitating easy carrying and stable storage. Further, with zippers 217 on multiple sides of the bag 200

The handbag 200 further comprises straps 224 extending up from the side panels 202. The straps 224 may be configured as shoulder straps or to be shorter and handheld. The straps 224 may be formed of any suitable materials similar to the straps 124 of the pet carrier 100.

Figure 4A:
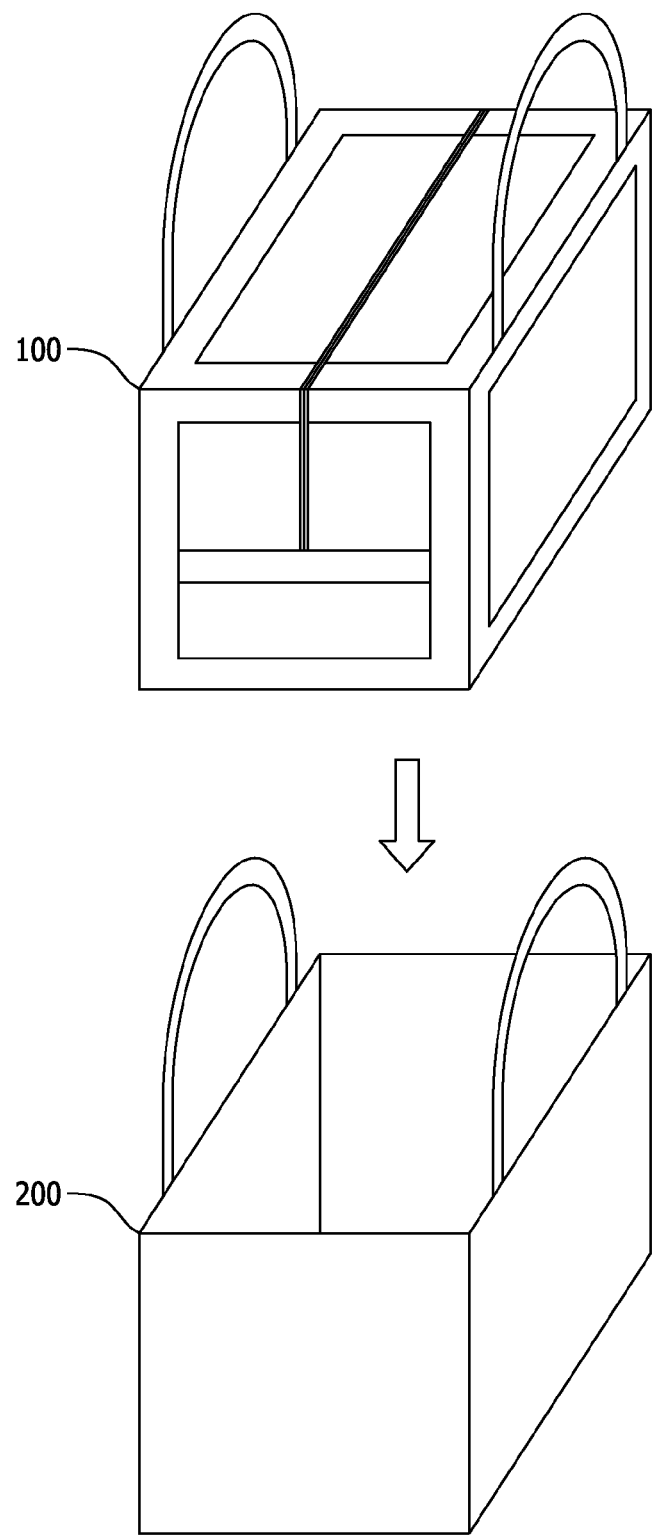
FIGS. 4A, 4B, and 4C show an interchangeable pet carrier being inserted into a handbag, according to an exemplary embodiment.
Figure 4B:
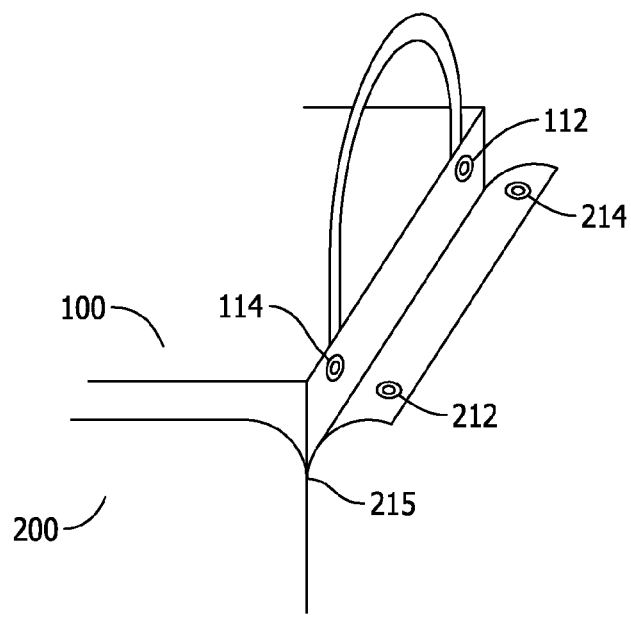
Figure 4C:
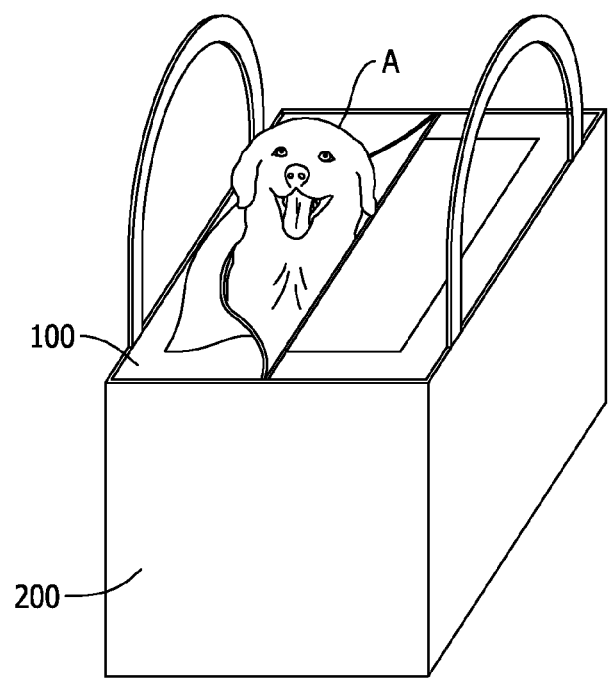

FIGS. 4A, 4B, and 4C show an interchangeable pet carrier being inserted into a handbag, according to an exemplary embodiment. In FIG. 4A, the pet carrier 100 is placed above the handbag 200. The handbag 200 is opened wide to receive the pet carrier 100. In FIG. 4B, the alternating male and female snaps 112, 114 of the pet carrier 100 are connected with the corresponding female and male snaps 214, 212 of the handbag 200. In some instances, the zipper 215 can be opened at least partially to enable easier connection of the snaps 112, 214, 114, 212. In FIG. 4C, the carrier 100 is shown completely inserted into the handbag 200. As shown, a pet A may thus be carried in the pet carrier 100 with the handbag 200 as an external shell.

Figure 5A:
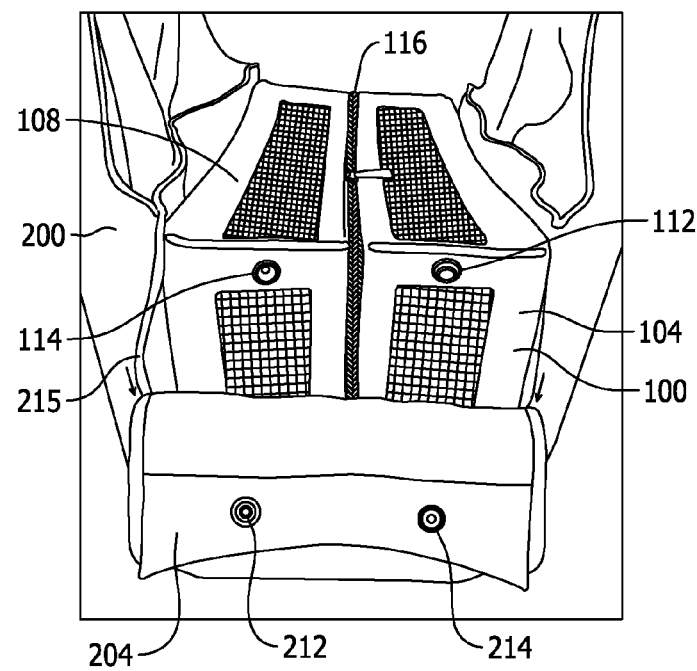
FIGS. 5A, 5B, and 5C show an interchangeable pet carrier and handbag forming a headrest, according to one exemplary embodiment.
Figure 5B:
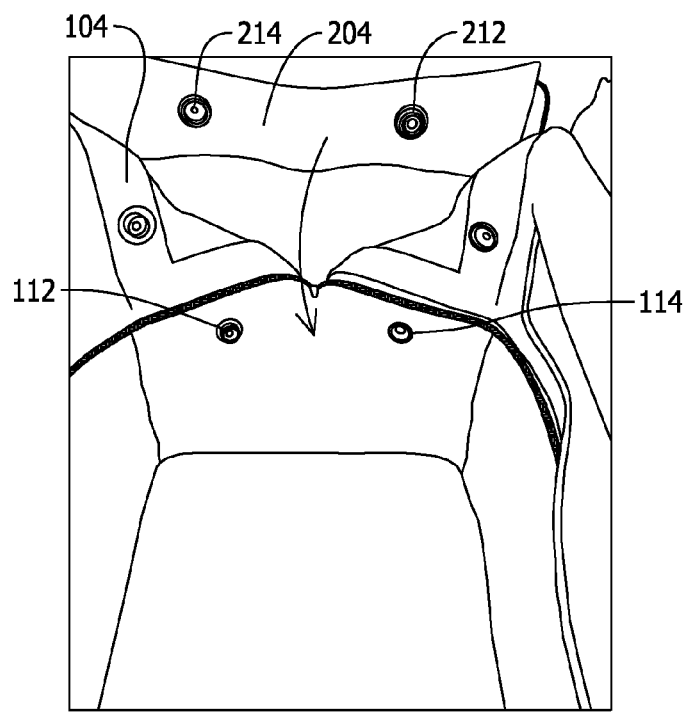
Figure 5C:
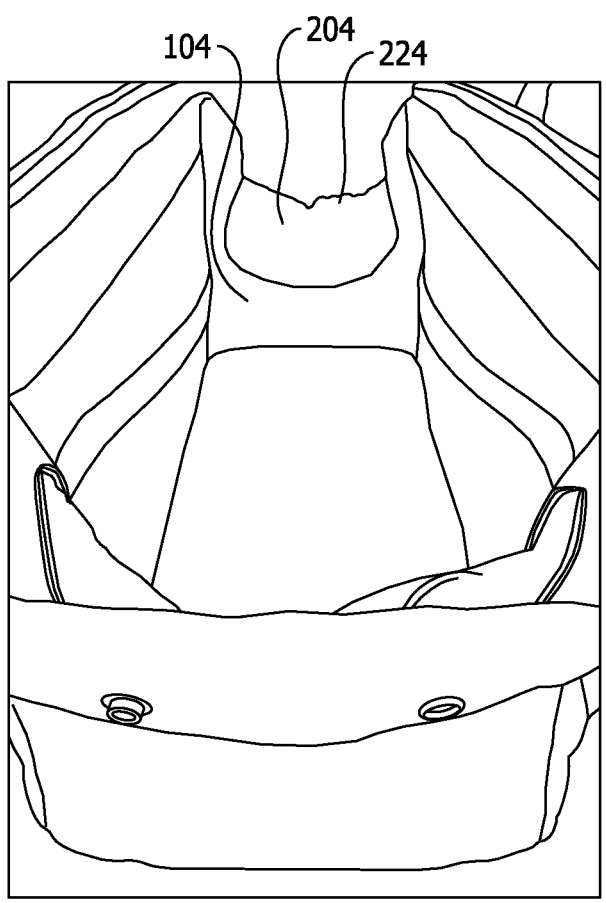
Figure 6B:
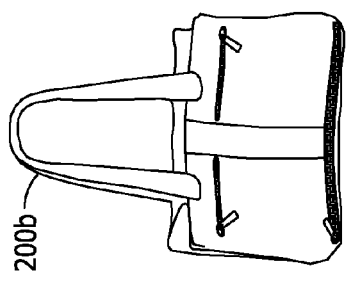
FIGS. 6A, 6B, 6C, and 6D show differently designed handbags for use with the interchangeable pet carrier, according to an exemplary embodiment.
Figure 6D:
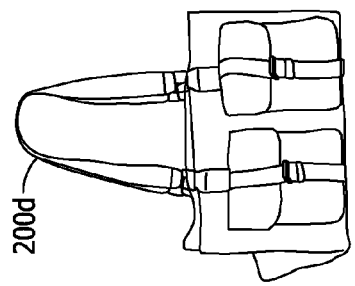
Figure 6A:
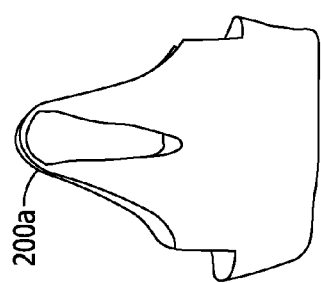
Figure 6C:
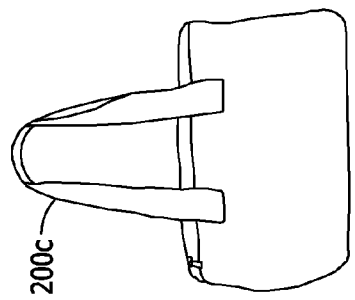

FIGS. 5A, 5B, and 5C show an interchangeable pet carrier and handbag forming a headrest, according to one exemplary embodiment. One advantage of the interchangeable pet carrier 100 and associated handbag 200 is that a head rest 224 may be created for the pet to rest its head while being transported. As shown in FIG. 5A, the side panels 204 are partially folded down by unzipping the zippers 215, exposing the interchangeable carrier 100. The connectors 112, 114 of the carrier 100 are disconnected from the connectors 212, 214 of the bag 200. The two way zipper 116 of the carrier 100 is opened, exposing the interior male and female snaps 112, 114, as shown in FIG. 5B. The portion of the side panel 204 of the handbag 200 that is unzipped may then be folded down into the carrier 100.

The male snap 212 of the handbag 200 may then be connected with the interior female snap 114 of the carrier 100, and the female snap 214 of the handbag 200 may be connected with the interior male snap 112 of the carrier 100. This holds the side panel 204 in the position shown in FIG. 5C. With the panel 204 so positioned, a head rest 224 is formed on which a pet may lay its head during transport.

FIGS. 6A, 6B, 6C, and 6D show differently designed handbags for use with the interchangeable pet carrier, according to an exemplary embodiment. The interchangeable pet carrier system has as an advantage that the user may carry any number of differently designed handbags while carrying his or her pet. Simultaneously, the pet may feel secure in always being carried in its same carrier. The pet thus experiences less stress by always being in the familiar feel, look, and smell of its carrier while the user may carry a bag to suit his or her particular storage needs or fashion tastes for any particular occasion.

For example, the interchangeable pet carrier 100 may be inserted into any one of the handbags 200a, 200b, 200c, 200d. It is noted that other designed handbags may also be used in additions to the examples shown. The handbags may also come in a variety of materials. Thus, the user may accessorize according to his or her preferences, while the pet enjoys its particular carrier.

Figure 7A:
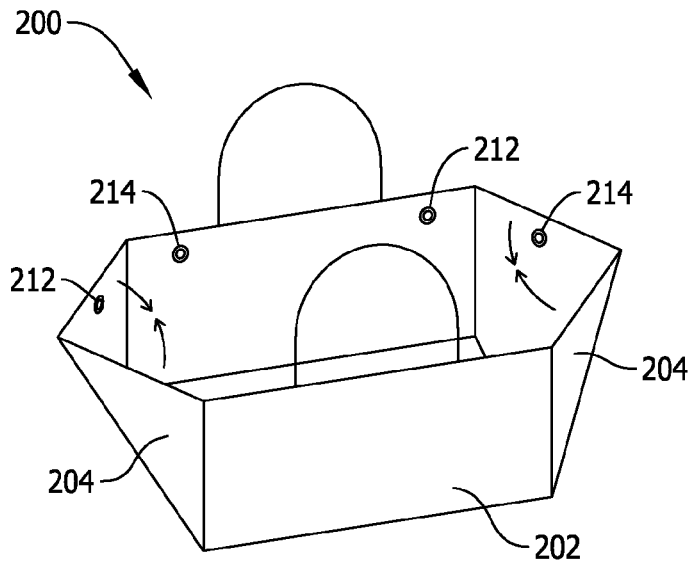
FIGS. 7A and 7B show a handbag without the interchangeable pet carrier formed into different shapes.
Figure 7B:
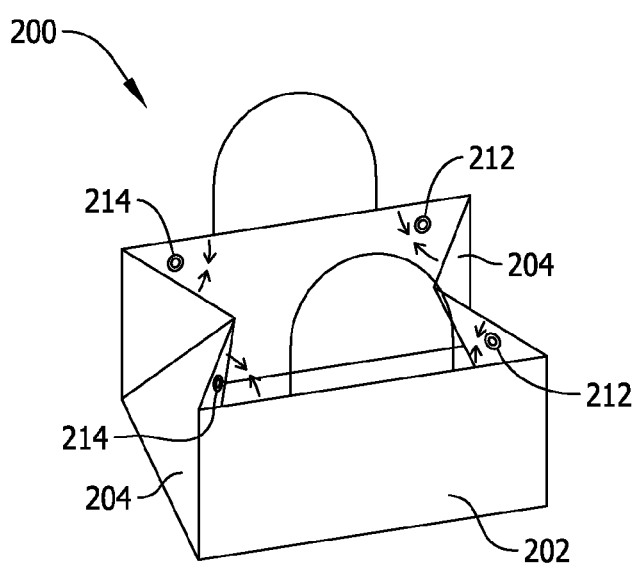

FIGS. 7A and 7B show a handbag without the interchangeable pet carrier formed into different shapes. Another advantage to the pet carrier system described herein is that the handbags may be used without the pet carrier. When the handbag 200 is used without the carrier 100, the handbag 200 may be formed into different shapes using the alternating interior snaps 212, 214.

For example, the side panels 204 may be folded outward such that the top of the handbag 200 can be closed with the side panels 204 extended outwards from the base, as shown in FIG. 7A. Because of the alternating arrangement of the snaps 212, 214, male snaps 212 line up with female snaps 214 to enable the handbag 200 to be closed in this manner.

As another example, the side panels 204 may be folded inward creating a more compact look for the handbag 200, as shown in FIG. 7B. Here, snaps 212, 214 disposed in the interior corners of the handbag 200 are connected together. That is, a male or female snap 212 on a side panel 202, 204 is snapped to the adjacent female or male snap 214, 212 on the adjacent side panel 204, 202. Because of the alternating arrangement of the snaps 212, 214, the male snaps 212 line up with the female snaps 214 to enable the handbag 200 to be shaped in this manner.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An interchangeable pet carrier system comprising:
   a pet carrier comprising:
      a bottom carrier panel, a pair of opposing short side carrier panels connected to the bottom carrier panel,
a pair of opposing long side carrier panels connected to the bottom carrier panel, the opposing long side carrier panels being disposed between the opposing short side carrier panels,
a top carrier panel disposed on top sides of the long side carrier panels and the short side carrier panels,
a carrier zipper disposed to run through the top carrier panel to separate the top carrier panel into first and second sides, and disposed to run partially down the short side carrier panels,
alternating first male and female connectors disposed along an exterior of an upper portion of the long side carrier panels and the short side carrier panels, and
a pair of first carrying straps connected to at least one of the long side carrier panels and the short side carrier panels; and
at least one handbag comprising:
a bottom bag panel,
a pair of opposing short side bag panels connected to the connected to the bottom bag panel,
a pair of opposing long side bag panels connected to the bottom bag panel, the opposing long side bag panels being disposed between the opposing short side carrier panels,
a bag zipper disposed along an upper portion of a connection between the short side carrier panels and the long side carrier panels,
alternating second male and female connectors disposed along an interior of an upper portion of the long side bag panels and the short side bag panels, and
a pair of second carrying straps connected to at least one of the long side bag panels and the short side bag panels;
the alternating first male and female connectors being disposed along the carrier so as to align with the alternating second male and female connectors disposed on the at least one handbag, the carrier being releasably secured within the handbag via the first and second alternating male and female connectors.

2. The interchangeable pet carrier system according to claim 1, wherein the at least one handbag includes a plurality of handbags having different exterior shapes.

3. The interchangeable pet carrier system according to claim 1, wherein the pet carrier further comprises a third male and female connectors disposed on an interior of the short side carrier panels below the first male and female connectors.

4. The interchangeable pet carrier system according to claim 3, wherein when the bag zipper is in an open condition, second male and female connectors on the short side bag panels are configured to connect with the third male and female connectors such that the short side bag panels are folded over and form a pet headrest.

5. The interchangeable pet carrier system according to claim 1, wherein the at least one handbag includes at least one storage pocket disposed on an exterior surface of at least one of the long side bag panels and short side bag panels.

6. The interchangeable pet carrier system according to claim 1, wherein the at least one handbag includes a lower pocket disposed within or on the bottom bag panel and extending throughout or covering the bottom bag panel, the lower pocket being configured to store a tablet computing device.

7. The interchangeable pet carrier system according to claim 1, wherein the carrier further comprises a pad that is disposed within the carrier on top of the bottom carrier panel on which a pet may sit.

8. A pet carrier comprising:
a bottom panel;
a pair of opposing short side panels connected to the bottom panel;
a pair of opposing long side panels connected to the bottom panel, the opposing long side panels being disposed between the opposing short side panels;
a top panel disposed on top sides of the long side panels and the short side panels;
a zipper disposed to run through the top panel to separate the top panel into first and second sides, and disposed to run partially down the short side panels;
alternating first connector halves disposed along an exterior of an upper portion of the long side panels and the short side panels;
second connectors halves disposed on in interior side of the short side panels below the first connector halves;
a pad that is disposed within the carrier on top of the bottom panel on which a pet may sit; and
a pair of first carrying straps connected to at least one of the long side panels and the short side panels,
the carrier being configured to be inserted into at least one handbag, the alternating connector halves being releasably attached to corresponding connector halves on the at least one handbag, and
when the zipper is in an open position and the top panel is separated into first and second sides, the second connector halves being configured to releasably attach to corresponding connector halves on the at least one handbag to form a pet headrest.

9. The pet carrier according to claim 8, wherein the zipper is a two-way zipper.

10. The pet carrier according to claim 8, wherein the connector halves are male and female snaps.

11. The pet carrier according to claim 8, wherein the connector halves are north and south poled magnets.

12. The pet carrier according to claim 8, wherein the connector halves a hook and loop sides of a hook and loop fastener.

13. An interchangeable pet carrier system comprising:
a pet carrier comprising:
a bottom carrier panel,
a pair of opposing short side carrier panels connected to the bottom carrier panel,
a pair of opposing long side carrier panels connected to the bottom carrier panel, the opposing long side carrier panels being disposed between the opposing short side carrier panels,
a top carrier panel disposed on top sides of the long side carrier panels and the short side carrier panels,
a carrier zipper disposed to run through the top carrier panel to separate the top carrier panel into first and second sides, and disposed to run partially down the short side carrier panels,
first connectors disposed along an exterior of an upper portion of the long side carrier panels and the short side carrier panels,
second connectors disposed on an interior of the short side carrier panels below the first connectors, and
a pair of first carrying straps connected to at least one of the long side carrier panels and the short side carrier panels; and
at least one handbag comprising:

a bottom bag panel, a pair of opposing short side bag panels connected to the connected to the bottom bag panel, a pair of opposing long side bag panels connected to the bottom bag panel, the opposing long side bag panels being disposed between the opposing short side carrier panels, a bag zipper disposed along an upper portion of a connection between the short side carrier panels and the long side carrier panels, third connectors disposed along an interior of an upper portion of the long side bag panels and the short side bag panels, and a pair of second carrying straps connected to at least one of the long side bag panels and the short side bag panels;

the first connectors being disposed along the carrier so as to align with the third connectors disposed on the at least one handbag, the carrier being releasably secured within the handbag via the first and third connectors, and when the carrier zipper and the bag zipper are in the open positions, the second connectors on the interior of the short side carrier panels connecting to the third connectors of the short side bag panels, the short side bag panels being folded over to form a pet headrest.

14. The interchangeable pet carrier system of claim 13, wherein the first connectors are comprised of alternating connector halves disposed about the carrier, and the third connectors are comprised of alternating connector halves disposed about the handbag.

15. The interchangeable pet carrier system of claim 14, wherein the first connectors and the third connectors are comprise of at least one of male and female snaps, north and south poled magnets, and hook and loop sides of hook and loop fasteners.

16. The interchangeable pet carrier system of claim 15, wherein when the carrier is not inserted into the at least one handbag, the alternating connector halves of the third connectors are configured to attach together to alter the shape of the at least on handbag.

17. The interchangeable pet carrier system according to claim 13, wherein the at least one handbag includes a lower pocket disposed within or on the bottom bag panel and extending throughout or covering the bottom bag panel, the lower pocket being configured to store a tablet computing device.

18. The interchangeable pet carrier system according to claim 13, wherein the carrier further comprises a pad that is disposed within the carrier on top of the bottom carrier panel on which a pet may sit.

19. The interchangeable pet carrier system according to claim 13, wherein the long side carrier panels and the short side carrier panels comprise mesh material allowing air to circulate within the carrier.

20. The interchangeable pet carrier system according to claim 13, wherein the zipper is a two-way zipper.

* * * * *